United States Patent
Nicola

(10) Patent No.: US 6,455,087 B1
(45) Date of Patent: Sep. 24, 2002

(54) SOLVENT EXTRACTION

(75) Inventor: Mazin Nicola, Worthing (GB)

(73) Assignee: Advanced Phytonics Limited, Ossett (GB)

( * ) Notice: Subject to any disclaimer, the term of this patent is extended or adjusted under 35 U.S.C. 154(b) by 0 days.

(21) Appl. No.: 09/402,449

(22) PCT Filed: Apr. 8, 1999

(86) PCT No.: PCT/GB98/01037
§ 371 (c)(1),
(2), (4) Date: Oct. 7, 1999

(87) PCT Pub. No.: WO98/45013
PCT Pub. Date: Oct. 15, 1998

(30) Foreign Application Priority Data

Apr. 8, 1997 (GB) ............................................. 9707130

(51) Int. Cl.[7] ............................. A23L 1/28; A01N 61/00
(52) U.S. Cl. ..................... 426/429; 424/195.1; 203/52; 203/59; 203/61; 203/67
(58) Field of Search ............................. 426/429; 203/52, 203/59, 61, 67; 422/256; 424/195.1

(56) References Cited

U.S. PATENT DOCUMENTS

| | | | |
|---|---|---|---|
| 3,155,523 A | * 11/1964 | Reich | |
| 3,669,679 A | * 6/1972 | Panzer et al. | |
| 3,769,033 A | * 10/1973 | Panzer et al. | |
| 3,928,579 A | 12/1975 | McShane | 424/167 |
| 4,059,604 A | 11/1977 | Kresse | 260/412 |
| 4,380,506 A | 4/1983 | Kimura et al. | 252/398 |
| 4,985,265 A | 1/1991 | Duboc et al. | 426/425 |
| 5,512,285 A | * 4/1996 | Wilde | |
| 5,665,798 A | * 9/1997 | Speaks et al. | |
| 5,824,225 A | * 10/1998 | Powell et al. | |
| 6,019,851 A | * 2/2000 | Pittet et al. | |
| 6,176,895 B1 | * 1/2001 | DeSimone et al. | |
| 6,224,847 B1 | * 5/2001 | Powell et al. | |

FOREIGN PATENT DOCUMENTS

| | | |
|---|---|---|
| EP | 0 616 821 | 9/1994 |
| GB | 1 419 958 | 12/1975 |
| GB | 2276392 | 9/1994 |
| GB | 2288552 | 10/1995 |
| WO | 89/00187 | 1/1989 |
| WO | 94/20486 | 9/1994 |
| WO | 95 26794 | 10/1995 |

OTHER PUBLICATIONS

WPI Accession No. 90–287600/199038&JP 020203904A.
WPI Accession No. 90–287599/199038&JP 020203903A.
WPI Accession No. 90–287598/199038&JP 020203902A.

* cited by examiner

Primary Examiner—Nina Bhat
(74) Attorney, Agent, or Firm—Arent Fox Kintner Plotkin & Kahn PLLC

(57) ABSTRACT

There is described a process for the extraction of a least one relatively polar component form a material which may be naturally occurring or a synthetic mixture, the process comprising the steps of: (a) contacting the material with a solvent mixture comprising C1 to C4 fluorinated hydrocarbon, especially 1,1,1,2-tetrafluorethan and a co-solvent having a dielectric constant (at 20° C.) of at least 6 so as to charge the solvent mixture wherein the co-solvent is selected from the group consisting of amides, sulfoxides, alcohols, ketones, organic acid, carboxylic acid derivatives, cyanide derivatives, ammonia sulfur containing molecules, inorganic acids and nitro derivatives and separating the charged solve mixture from the material to isolate the polar component.

29 Claims, No Drawings

SOLVENT EXTRACTION

This application claims benefit under 35 U.S.C. 371 of PCT/GB98/01037 filed Apr. 8, 1998.

This invention relates to solvent extraction and particularly, although not exclusively, provides a solvent extraction process and a novel solvent mixture for use in solvent extraction.

Applicant's co-pending European Patent Application No. 94 301199.9 describes an improved method for the extraction, concentration and preservation of fragrances and flavours using an extraction solvent comprising a non-chlorinated hydrocarbon solvent in the liquid phase. The method is found to selectively extract oils from natural raw materials, for example rose oil from roses.

PCT Patent Publication No. WO 95/26794 (Imperial Chemical Industries Plc) describes a process for extracting a composition comprising a biologically active compound or a precursor thereof from a raw material using an extraction solvent comprising a $C_{1-4}$ (hydro)fluorocarbon together with a co-solvent selected from dimethyl ether and butane.

Whilst the processes described in the aforementioned documents are advantageous in some circumstances, there is a limit to the types of materials that can be extracted. For example, relatively polar materials cannot be extracted from raw materials.

It is an object of the present invention to address problems associated with the aforementioned processes.

According to a first aspect of the present invention, there is provided a process for the extraction of at least one relatively polar component from a material comprising the steps of:

(a) contacting the material with a solvent mixture comprising a $C_1$ to $C_4$ fluorinated hydrocarbon and a co-solvent having a dielectric constant (at 20° C.) of at least 5; and (b) separating the charged solvent mixture from said material.

Unless otherwise stated herein, an alkyl group may have up to 10, preferably up to 8, more preferably up to 6, especially up to 4 carbon atoms, with methyl and ethyl groups being preferred. Any alkyl group referred to herein may be optionally substituted with one or more substituents which may be selected from halogen atoms, and optionally substituted alkyl, acyl, acetal, hemiacetal, acetalalkyloxy, hemiacetalalkyloxy, nitro, cyano, alkoxy, hydroxy, amino, alkylamino, sulphinyl, alkylsulphinyl, sulphonyl, alkylsulphonyl, sulphonate, amido, alkylamido, alkylcarbonyl, alkoxycarbonyl, halocarbonyl and haloalkyl groups. Preferably, alkyl groups referred to are unsubstituted.

The $C_1$ to $C_4$ fluorinated hydrocarbon may be non-chlorinated. Preferably, it comprises one or more carbon, fluorine and hydrogen atoms only. Preferably, said fluorinated hydrocarbon is a $C_1$ to $C_3$, more preferably, a $C_1$ to $C_2$ fluorinated hydrocarbon. Especially preferred is a $C_2$ fluorinated hydrocarbon.

Said fluorinated hydrocarbon may include up to 10, preferably up to 8, more preferably up to 6, especially up to 4, fluorine atoms.

Said fluorinated hydrocarbon is preferably aliphatic. It is preferably saturated.

Said fluorinated hydrocarbon may have a boiling point at atmospheric pressure of less than 20° C., preferably less than 10° C., more preferably less than 0° C., especially less than −10° C. The boiling point may be greater than −90° C., preferably greater than −70° C., more preferably greater than −50° C.

A preferred fluorinated hydrocarbon solvent is tetrafluoroethane with 1,1,1,2-tetrafluoroethane being especially preferred.

The dielectric constant of said co-solvent may be at least 6, is preferably at least 15 and is especially at least 20. The dielectric constant may be less than 120, preferably less than 110, more preferably less than 100, especially less than 90.

The boiling point of said co-solvent may be greater than 0° C., preferably greater than 25° C., more preferably greater than 40° C., especially greater than 50° C. Said boiling point may be less than 250° C., preferably less than 215° C., more preferably less than 175° C., especially less than 150° C.

Said solvent mixture may include at least 0.25 wt %, preferably at least 0.5 wt %, more preferably at least 1 wt %, especially at least 2 wt % of said co-solvent. Said solvent mixture may include less than 20 wt %, preferably less than 15 wt %, more preferably less than 10 wt %, of said co-solvent.

Said solvent mixture may include at least 60 wt %, preferably at least 70 wt %, more preferably at least 80 wt %, especially at least 90 wt % of said fluorinated hydrocarbon.

Said solvent mixture preferably comprises a substantially saturated solution of said co-solvent in said fluorinated hydrocarbon.

Said co-solvent may be selected from amides, especially N,N'-dialkylamides and alkylamides, with dimethylformamide and formamide being preferred; sulphoxides, especially dialkyl sulphoxides, with dimethylsulphoxide being preferred; alcohols, especially aliphatic alcohols for example alkanols, with methanol, ethanol, 1-propanol and 2-propanol being preferred; ketones, especially aliphatic ketones, for example dialkyl ketones, with acetone being especially preferred; organic acids, especially carboxylic acids with formic acid and acetic acid being preferred; carboxylic acid derivatives, for example anhydrides, with acetic anhydride being preferred; cyanide derivatives, for example hydrogen cyanide and alkyl cyanides, with methyl cyanide and liquefied anhydrous hydrogen cyanide being preferred; ammonia; sulphur containing molecules including sulphur dioxide, hydrogen sulphide and carbon disulphide; inorganic acids for example hydrogen halides with liquefied anhydrous hydrogen fluoride, chloride, bromide and iodide being preferred; nitro derivatives, for example nitroalkanes and nitroaryl compounds, with nitromethane and nitrobenzene being especially preferred.

Preferably, said co-solvent is selected from carboxylic acids, carboxylic acid derivatives, especially amides, ketones and alcohols. Said co-solvent may have less than 10, preferably less than 8, more preferably less than 6, especially less than 4 carbon atoms. Said co-solvent is preferably an aliphatic compound.

Said co-solvent is preferably substantially unable to react with said component and/or with said material under the conditions of said process.

Said co-solvent and said $C_{1-4}$ fluorinated hydrocarbon preferably form a constant boiling mixture or azeotrope.

Said solvent mixture may include a first and second co-solvent each of which may independently have any of the properties or features of said co-solvent referred to hereinabove.

In the method, the charged solvent may be collected by decantation. Alternatively, the charged solvent may be collected by sedimentation. Alternatively, the charged solvent may be collected by filtration.

The method preferably includes the step of removing said solvent mixture from the remainder of said material, after step (b). Removal of said solvent material may be achieved by providing conditions for the evaporation of said solvent. For example, the temperature may be raised, suitably less than 50° C., preferably less than 40° C., more preferably less than 30° C., and/or the pressure may be reduced to less than atmospheric pressure.

As an alternative to evaporating the solvent or in addition thereto, the solvent mixture (including the extract(s)) may be washed with copious amounts of water which may be suitable when the co-solvent(s) have some solubility in water and/or is/are less volatile than the $C_{1-4}$ fluorinated hydrocarbon. Thus, in this case, the co-solvent(s) may be removed by dissolution in water and, subsequently, the $C_{1-4}$ fluorinated hydrocarbon may be removed by evaporation as aforesaid. Where washing with water in the manner described does not produce a satisfactory result, for example due to the formation of an emulsion or where the extract itself is also removed in high qualities by dissolution in the water, a salt, for example sodium sulphate or sodium chloride, may be added to the water to suppress the ionisation and solubility of the extracted components.

The process may include additional steps before or after the steps described above. In one embodiment, said material containing said component may be contacted with an alternative solvent or solvent mixture, suitably prior to steps (a) above. Said alternative solvent or solvent mixture preferably is arranged to extract relatively non-polar components and preferably comprises a $C_{1-4}$ fluorinated hydrocarbon, optionally in combination with one or more co-solvents having a dielectric constant at 20° C. of less than 5. Said $C_{1-4}$ fluorinated hydrocarbon of said alternative solvent or solvent mixture may be as described in any statement herein. Said co-solvent(s) may be as described in WO 95/26794, the contents of which are incorporated herein by reference.

Said material containing said component may be naturally occurring or a synthetic mixture, for example a reaction mixture. Said component may be a pharmaceutical product or an intermediate produced from the fermentation of mycelial or fungal culture or a product from a synthetic chemical reaction. Said component is preferably an active ingredient, for example it may be a pharmaceutical or pesticide, or a pre-cursor thereof.

Said material containing said component is preferably an organic material which is preferably naturally occurring (or at least a pre-cursor thereof is naturally occurring) and/or is of natural origin. Said material is preferably a biomass.

According to a second aspect of the present invention, there is provided a solvent mixture comprising a $C_1$ to $C_4$ fluorinated hydrocarbon and a co-solvent having a dielectric constant (at 20° C.) of at least 5.

The invention extends to the use of a solvent mixture as described herein in a solvent extraction process.

Any feature of any aspect of any invention or embodiment described herein may be combined with any feature of any other aspect of any invention or embodiment described herein.

The invention will now be described, by way of example.

EXAMPLE 1

Two PET 210 ml extraction bottles were each charged with a known weight of dried and finely ground ginger root. Each bottle was then assembled with a gas tight lid incorporating an aerosol valve and a filter element. 1,1,1,2-tetrafluorethane (1,1,1,2-TFE) (100 g) was charged to a first bottle and to the other was charged a pre-prepared solution of 1,1,1,2-tetrafluoroethane/10% v/v acetone (100 g). Both bottles were treated in an identical manner as follows: agitated for 5 minutes; solvent extract released into an evaporator flask and evaporated under slight vacuum and gentle heating; and when constant weight was attained, the remaining oil was isolated and weighed.

Results

Both samples produced were found to be largely composed of the sesquiterpene "zingiberene", the major functional component of ginger flavour.

|  | 1, 1, 1, 2-TFE | 1, 1, 1, 2-TFE + 10% acetone |
|---|---|---|
| Weight ginger (g) | 36.06 | 35.65 |
| Weight solvent (g) | 100 | 100 |
| Weight product (g) | 0.30 | 0.51 |
| Yield (% w/w) | 0.83 | 1.43 |

EXAMPLE 2

A known weight of dried and ground marigold flowers was charged into each of two PET bottles as described in example 1. 1,1,1,2-TFE (100 g) was charged to one bottle and to the other was charged 100 g of a solution of 1,1,1,2-TFE containing 10% acetic acid. The two bottles were treated in an identical manner as follows: agitated vigorously for 5 minutes the allowed to stand for a further 5 minutes; the extract solution was discharged into a pre-weighed evaporation flask and the solvents were evaporated using slight vacuum and moderate heat; and when constant weight was attained, the resulting oil was isolated and weighed.

Results

GC analysis on the resulting oils showed that the extract obtained using the mixture of 1,1,1,2-TFE and acetone was richer in carotenoids than the TFE only extract.

|  | 1, 1, 1, 2-TFE | 1, 1, 1, 2-TFE + 10% acetic acid |
|---|---|---|
| Weight marigold (g) | 36.05 | 35.54 |
| Weight solvent (g) | 100 | 100 |
| Weight product (g) | 0.63 | 1.05 |
| Yield (% w/w) | 1.75 | 2.95 |

EXAMPLE 3

A known weight of dried and ground sage leaves was charged into each of two PET bottles as described in the above examples. To one bottle was charged 100 g of 1,1,1,2-TFE and to the other was charged a solution of 1,1,1,2-TFE containing 10% methanol. Both bottles were treated in an identical manner as described in Examples 1 and 2.

Results

The mixture of 1,1,1,2-TFE and methanol was markedly greener in colour than the sample of 1,1,1,2-TFE alone indicating a higher rosmarinic acid content in the solvent mixture. Rosmarinic acid is a major constituent of sage oil.

|  | 1, 1, 1, 2-TFE | 1, 1, 1, 2-TFE + 10% methanol |
|---|---|---|
| Weight sage (g) | 14.05 | 13.92 |
| Weight solvent (g) | 100 | 100 |
| Weight product (g) | 0.06 | 0.35 |
| Yield (% w/w) | 0.43 | 2.49 |

EXAMPLE 4

A known weight of dried and ground thyme leaves was charged into each of two PET bottles as described in the above examples. To one bottle was charged 100 g of 1,1,1,2-TFE and to the other a solution of 1,1,1,2-TFE containing 5% acetic acid. Both bottles were treated in an identical manner as described in the previous examples.

Results

Similar products were obtained from both experiments with both oils exhibiting typical characteristics of thyme oil.

|  | 1, 1, 1, 2-TFE | 1, 1, 1, 2-TFE + 10% acetic acid |
|---|---|---|
| Weight thyme (g) | 12.76 | 12.85 |
| Weight solvent (g) | 100 | 100 |
| Weight product (g) | 0.33 | 0.42 |
| Yield (% w/w) | 2.59 | 3.27 |

EXAMPLE 5

The apparatus used for this experiment consisted of a 19 lt extraction vessel, an evaporator vessel, a gas compressor and a heat exchanger. The whole apparatus was assembled in such a way that would allow a continuous recycling of the extractant solvent through the packed biomass bed.

2.0 Kg of dried and ground rosemary (Rosemarinus Officinalis L) were packed into the extraction vessel. The apparatus was then sealed and evacuated to 10 mbar pressure and extraction was achieved by passing a total of 5 Kg of 1,1,1,2-TFE through the packed biomass bed. The resulting extract was evaporated to a constant weight and the oil produced was isolated and weighed.

A fresh charge of rosemary was treated in an identical manner but using a solution of 1,1,1,2-TFE containing 10% acetone.

Results

Both products exhibited similar characteristics typical of conventionally produced rosemary oil with rosmarinic acid being the dominant constituent.

|  | 1, 1, 1, 2-TFE | 1, 1, 1, 2-TFE + 10% acetic acid |
|---|---|---|
| Weight rosemary (Kg) | 2.00 | 2,00 |
| Weight solvent (Kg) | 5.00 | 5.00 |
| Weight product (g) | 17.79 | 106.04 |
| Yield (%) | 0.89 | 5.30 |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A solvent extraction process for the extraction of at least one polar component from a material comprising the steps of
   (a) contacting the material with a solvent mixture comprising tetrafluoroethane and a co-solvent having a dielectric constant (at 20° C.) of at least 6 so as to charge said solvent mixture with said at least one polar component and thereby prepare a charged solvent mixture, wherein said co-solvent is selected from the group consisting of amides, sulphoxides, alcohols, ketones, organic acids, carboxylic acid derivatives, cyanide derivatives, ammonia, sulphur containing molecules, inorganic acids and nitro derivatives; and
   (b) separating the charged solvent mixture from said material.

2. A process according to claim 1, wherein said tetrafluoroethane is 1,1,1,2-tetrafluoroethane.

3. A process according to claim 1, wherein said dielectric constant of said co-solvent is at least 15.

4. A process according to claim 1, wherein said dielectric constant of said co-solvent is less than 120.

5. A process according to claim 1, wherein the boiling point of said co-solvent is less than 25° C.

6. A process according to claim 1, wherein the boiling point of said co-solvent is less than 250° C.

7. A process according to claim 1, wherein said solvent mixture includes at least 0.25 wt % of said co-solvent.

8. A process according to claim 1, wherein said solvent mixture includes at least 0.5 wt % of said co-solvent.

9. A process according to claim 1, wherein said solvent mixture includes at least 1 wt % of said co-solvent.

10. A process according to claim 1, wherein said solvent mixture includes at least 2 wt % of said co-solvent.

11. A process according to claim 1, wherein said solvent mixture includes less than 20 wt % of said co-solvent.

12. A process according to claim 1, wherein said solvent mixture includes less than 15 wt % of said co-solvent.

13. A process according to claim 1, wherein said solvent mixture includes less than 10 wt % of said co-solvent.

14. A process according to claim 1, wherein said solvent mixture includes at least 60 wt % of tetrafluoroethane.

15. A process according to claim 1, wherein said solvent mixture includes at least 70 wt % of tetrafluoroethane.

16. A process according to claim 1, wherein said solvent mixture includes at least 80 wt % of tetrafluoroethane.

17. A process according to claim 1, wherein said mixture includes at least 90 wt % of tetrafluoroethane.

18. A process according to claim 1, wherein said co-solvent is selected from the group consisting of amides, sulphoxides, alcohols, ketones, organic acids, carboxylic acid derivatives, cyanide derivatives, ammonia, sulphur containing molecules, inorganic acids and nitro derivatives.

19. A process according to claim 1, wherein said co-solvent is selected from the group consisting of carboxylic acids, carboxylic acid derivatives, ketones and alcohols.

20. A process according to claim 1, wherein said material containing said component is contacted with a solvent or solvent mixture prior to step (a).

21. A process according to claim 20, wherein said solvent or solvent mixture is arranged to extract non-polar components and comprises a $C_{1-4}$ fluorinated hydrocarbon.

22. A process according to claim 21, wherein said solvent mixture arranged to extract non-polar components comprises a $C_{1-4}$ fluorinated hydrocarbon in combination with one or more co-solvents having a dielectric constant at 20° C. of less than 5.

23. The process according to claim 1, wherein the co-solvent is selected from the group consisting of amides, ketones and alcohols.

24. The process according to claim 1, wherein said solvent mixture includes a first co-solvent and a second co-solvent each of which has a dielectric constant (at 20° C.) of at least 6 and each being selected from the group consisting of amides, sulphoxides, alcohols, ketones, organic acids, carboxylic acid derivatives, cyanide derivatives, ammonia, sulphur containing molecules, inorganic acids and nitro derivatives.

25. The process according to claim 1, wherein said solvent mixture includes a first co-solvent and a second co-solvent each of which has a dielectric constant (at 20° C.) of at least 6 and each being selected from the group consisting of amides, ketones and alcohols.

26. A solvent extraction process for the extraction of at least one polar component from a bio-mass comprising the steps of
  (a) contacting the bio-mass with a solvent mixture comprising tetrafluoroethane and a co-solvent having a dielectric constant (at 20° C.) of at least 6 so as to charge said solvent mixture with said at least one polar component and thereby prepare a charged solvent mixture, wherein said co-solvent is selected from the group consisting of amides, sulphoxides, alcohols, ketones, organic acids, carboxylic acid derivatives, cyanide derivatives, ammonia, sulphur containing molecules, inorganic acids and nitro derivatives; and
  (b) separating the charged solvent mixture from said biomass.

27. A solvent extraction process for the extraction of at least one polar component from a material, wherein said at least one polar component is selected from the group consisting of a pharmaceutical product, an intermediate compound produced from the fermentation of a mycelial culture, an intermediate compound produced from the fermentation of a fungal culture and a product from a synthetic chemical reaction, the process comprising the steps of:
  (a) contacting the material with a solvent mixture comprising tetrafluoroethane and a co-solvent having a dielectric constant (at 20° C.) of at least 6 so as to charge said solvent mixture with said at least one polar component and thereby prepare a charged solvent mixture, wherein said co-solvent is selected from the group consisting of amides, sulphoxides, alcohols, ketones, organic acids, carboxylic acid derivatives, cyanide derivatives, ammonia, sulphur containing molecules, inorganic acids and nitro derivatives; and
  (b) separating the charged solvent mixture from said material.

28. A solvent extraction process for the extraction of at least one polar component from a material, wherein said at least one polar component is an active ingredient selected from the group consisting of a pharmaceutical, a pesticide, a precursor of a pharmaceutical and a precursor of a pesticide, said process comprising the steps of:
  (a) contacting the material with a solvent mixture comprising tetrafluoroethane and a co-solvent having a dielectric constant (at 20° C.) of at least 6 so as to charge said solvent mixture with said at least one polar component and thereby prepare a charged solvent mixture, wherein said co-solvent is selected from the group consisting of amides, sulphoxides, alcohols, ketones, organic acids, carboxylic acid derivatives, cyanide derivatives, ammonia, sulphur containing molecules, inorganic acids and nitro derivatives; and
  (b) separating the charged solvent mixture from said material.

29. A process for isolating a polar component from a bio-mass comprising the steps of:
  (a) contacting the bio-mass with a solvent mixture comprising tetrafluoroethane and a co-solvent having a dielectric constant (at 20° C.) of at least 6 so as to charge said solvent mixture with said at least one polar component and thereby prepare a charged solvent mixture, wherein said co-solvent is selected from the group consisting of amides, sulphoxides, alcohols, ketones, organic acids, carboxylic acid derivatives, cyanide derivatives, ammonia, sulphur containing molecules, inorganic acids and nitro derivatives;
  (b) separating the charged solvent mixture from said bio-mass; and
  (c) separating said solvent mixture from said at least one polar component thereby to isolate said at least one polar component.

\* \* \* \* \*